(12) United States Patent
Lord

(10) Patent No.: US 7,114,172 B2
(45) Date of Patent: Sep. 26, 2006

(54) SYNCHRONIZED PERSONAL VIDEO RECORDERS

(75) Inventor: William P. Lord, Fishkill, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 883 days.

(21) Appl. No.: 09/894,060

(22) Filed: Jun. 28, 2001

(65) Prior Publication Data

US 2003/0002849 A1    Jan. 2, 2003

(51) Int. Cl.
    *H04N 7/18*    (2006.01)
(52) U.S. Cl. .......................... 725/80; 725/109; 386/86
(58) Field of Classification Search ............... 386/1, 386/68, 45, 70, 46, 125, 126; 725/131, 88, 725/133, 89, 139, 37, 141, 151, 153, 109, 725/110, 80; 348/552
See application file for complete search history.

(56) References Cited

U.S. PATENT DOCUMENTS

| | | | | |
|---|---|---|---|---|
| 4,785,472 A | * | 11/1988 | Shapiro | .................... 379/93.19 |
| 4,829,372 A | * | 5/1989 | McCalley et al. | ............. 725/93 |
| 5,365,579 A | * | 11/1994 | Hendrickson | .......... 379/102.01 |
| 5,808,662 A | * | 9/1998 | Kinney et al. | ................ 725/88 |

\* cited by examiner

*Primary Examiner*—James J. Groody
*Assistant Examiner*—James A. Fletcher

(57) ABSTRACT

A method, apparatus and system for synchronizing the video output of personal video recorders in two or more locations. A broadcast program is received and recorded on a personal video recorder on a first personal video recorder. Thus, at least one program will be stored in memory in the first personal video recorder. A second personal video recorder having a common program residing in its memory is selected. A signal is then transmitted to or from the first personal video recorder to simultaneously initiate a start sequence in each of the first and second personal video recorders. The start signal may be transmitted over the Internet or by other communication means such as telephone lines.

19 Claims, 12 Drawing Sheets

US 7,114,172 B2

SYNCHRONIZED PERSONAL VIDEO RECORDERS

FIELD OF THE INVENTION

The present invention relates generally to personal video recorders, and more particularly to techniques for synchronizing the video output of personal video recorders in two or more locations.

BACKGROUND OF THE INVENTION

Personal video recorders (PVRs) as discussed herein include digital video recorders and may be used in conjunction with virtually every television broadcast system (e.g., cable, digital cable, satellite, antenna, or combinations thereof). Personal video recorders may be programmed to automatically find and record a user's favorite television program or programs so that the user may watch what he or she wants, when he or she wants. Typically, personal video recorders contain a substantial amount of memory and are capable of recording more than thirty hours of programming. The recorded programming may then be retrieved and viewed by the user as desired.

Current personal video recorder technology allows users to time shift the content of the program being recorded (typically television broadcasts). In other words, a user may record a television broadcast and watch it several hours, or even days, later. Alternatively, a user may decide to record a program and begin watching it a predetermined amount of time after the start of the program so that the user has the ability to skip any commercials that may be dispersed throughout the program. Thus, the user would be watching the program during virtually the same time period as people who are watching the live broadcast. However, given the capability to skip through the commercials, the user of the personal video recorder will watch the same program as someone else in less time.

Notwithstanding the above benefits of personal video recorders, there are disadvantages associated with their use. For example, many people enjoy watching various programs simultaneously (e.g., sporting events, talk shows or dramas) even though the people may be physically located in different locations. These people will often communicate with each other during the program by other communication means such as the telephone or Internet. Therefore, they are able to discuss the program as the events materialize. However, as people time shift content they lose the ability to simultaneously watch shows "together" while at their respective locations. Inevitably, the two users will be watching the same program out of synchronization and therefore one user will know the results of a dramatic scene or a sporting event, for example, prior to the other user.

Thus a need exists for techniques which will allow two or more people with personal video recorders to synchronize their time-shifted viewing.

SUMMARY OF THE INVENTION

The present invention provides techniques for synchronizing the video output of personal video recorders in two or more locations.

In accordance with one aspect of the invention, a method for synchronizing the video output of personal video recorders in two or more locations is disclosed. In accordance therewith, a broadcast program is received and recorded on a personal video recorder on a first personal video recorder. Thus, at least one program will be stored in memory in the first personal video recorder. A second personal video recorder having a common program residing in its memory is selected. A signal is then transmitted to or from the first personal video recorder to simultaneously initiate a start sequence in each of the first and second personal video recorders. The start signal may be transmitted over the Internet or by other communication means such as telephone lines.

In accordance with another aspect of the present invention, a system for synchronizing the video output of personal video recorders is provided. The system includes at least two personal video recorders having a common program stored in memory associated with each of the personal video recorders. A communication means is operatively connected to the personal video recorders for transmitting a signal from one of the personal video recorders to the other to simultaneously initiate a start sequence in each of the personal video recorders.

In accordance with yet another aspect of the present invention, an apparatus for synchronizing the video output of personal video recorders is disclosed. The apparatus includes a first personal video recorder having at least one program stored in memory, and a control device for transmitting a signal from the first personal video recorder to a second personal video recorder for simultaneously initiating a start sequence in each of the first and second personal video recorders. A television may be operatively connected to the personal video recorders.

BRIEF DESCRIPTION OF THE DRAWINGS

For a better understanding of the invention, reference is made to the following description of exemplary embodiments, and to the accompanying drawings, wherein.

DETAILED DESCRIPTION OF THE INVENTION

The present invention provides techniques which will allow two or more people with personal video recorders to synchronize their time-shifted viewing.

Figure 1:
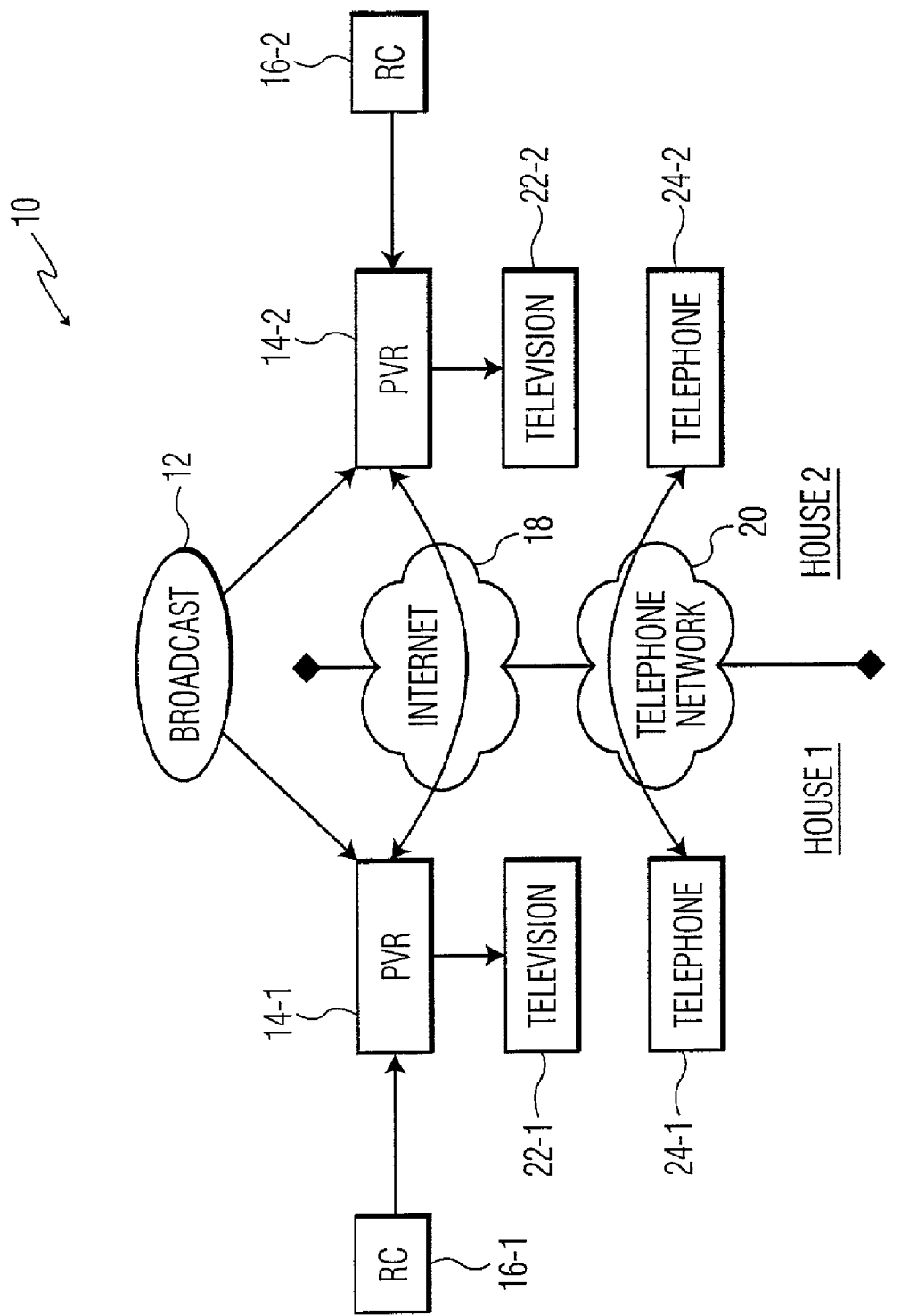
FIG. 1 is a block diagram illustrating an example of two synchronized personal video recorders in accordance with an embodiment of the present invention.

Referring now in specific detail to the drawings in which like reference numerals identify similar or identical elements throughout the several views, and initially to FIG. 1, an example of a synchronized personal video recorder viewing system 10 in accordance with the present invention is illustrated. As illustrated in FIG. 1, a broadcast 12 of a television program is made pursuant to any communication means known to one having ordinary skill in the art, such as cable, digital cable, satellite, terrestrial broadcast, or combinations thereof. The broadcast may also or alternatively comprise digital video disk (DVD) information, VHS information, a file downloaded from the Internet, or content configured using any other means known to one having ordinary skill in the art. The same broadcast 12 is transmitted to each of two different locations, denoted as House 1 and House 2 in the figure. As the broadcast 12 enters House 1 and House 2, it is received by a receiver (not shown) within each of the respective personal video recorders 14-1 and 14-2. Accordingly, the user has the ability to record the broadcast 12 in the respective personal video recorder 14. It is also contemplated that the signal from the broadcast may be received in a receiver housed within a set-top box, DVD player, VHS player, personal computer or a television, and then routed to the personal video recorder 14. The user has the ability to record a variety of different programs in personal video recorder 14 along the bandwidth of the incoming broadcast signal. Additionally, since the broadcast signal is routed to each house separately, a user in each house has the ability to separately turn the broadcast signal on or off. The personal video recorder 14 has an output that is connected to an input on a television 22 so that the user may view the recorded programs on the television 22.

Remote controls 16-1 and 16-2 are commonly associated with the personal video recorder 14-1 and 14-2 to allow the users to operate the personal video recorder 14-1 and 14-2, remotely. Typically, the remote control 16-1 and 16-2 are configured to transmit an infrared signal to the television 22-1 and 22-2.

The system 10 has two communication networks associated therewith. The first is an Internet network 18 that interconnects the personal video recorders 14-1 and 14-2 located at the two different locations (e.g., House 1 and House 2). In this illustrative embodiment, the Internet network 18 supplies the means for communicating information between the personal video recorders 14-1 and 14-2 such that synchronization may be achieved. The second communication network is a telephone network 20 which provides a communication means for the two users to communicate while they are simultaneously viewing the recorded program 12.

In order to implement the system 10, one of the users, e.g., user 1 from House 1, calls the other user, e.g., user 2 from House 2, and the two respective users will agree to simultaneously and synchronously watch a pre-recorded broadcast or a live broadcast with the ability to buffer in the personal video recorder, on their respective televisions 22-1 and 22-2. One of the two users would then take the lead to initiate the synchronization in process.

Assuming that user 1 takes the lead, user 1, via remote control 16-1 or via controls on the personal video recorder 14-1 itself, activates a menu for synchronized viewing on the personal video recorder 14-1. A memory device and a processor may reside in the personal video recorders 14-1 and 14-2 and/or one or more of the other devices associated with system 10. Programming code associated with the system 10 resides in the memory device(s) and is processed by the processor(s).

Figure 2:
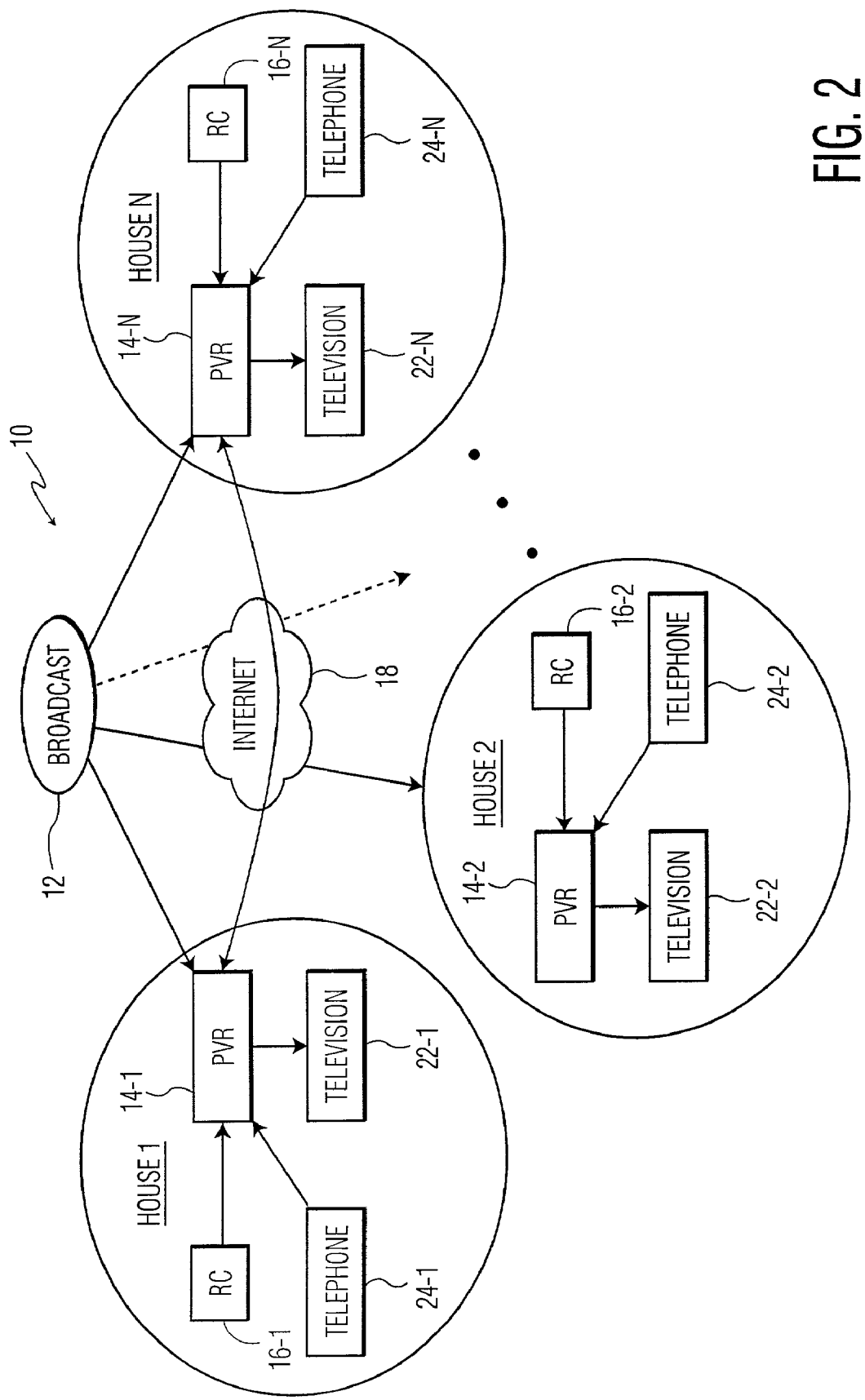
FIG. 2 is a block diagram illustrating an example of two or more synchronized personal video recorders in accordance with an embodiment of the present invention.

Referring now to FIG. 2, there is shown another embodiment of the present invention. FIG. 2 is a block diagram illustrating an example of a synchronized personal video recorder viewing system 10 which is configured for use by two or more people desiring to watch a program at the same time, in synch and while physically located in different locations. As illustrated in FIG. 2, a broadcast 12 of a television program is made pursuant to any communication means known to one having ordinary skill in the art, such as cable, digital cable, satellite, antenna, or combinations thereof. The same broadcast 12 is transmitted to each of House 1, House 2 through House N. As the broadcast 12 enters House 1, House 2 through House N, it is received by a receiver within in each of the respective personal video recorders 14-1 through 14-N. Accordingly, the users in the various houses 1 through N (which are intended to simulate different physical locations for each user) have the option of recording the broadcast 12 in the personal video recorder 14-1 through 14-N. Since the broadcast signal is received directly into the personal video recorders 14-1 through 14-N, the user has the ability to record a variety of different programs. Additionally, since the broadcast signal is routed to each house separately, each house has the ability to separately turn the broadcast signal on or off. The personal video recorders 14-1 through 14-N have outputs that are connected to inputs on televisions 22-1 through 22-N so that the users may view the recorded programs on the televisions 22-1 through 22-N. Remote controls 16-1 through 16-N are commonly associated with the personal video recorder 14-1 through 14-N to allow the users to operate the personal video recorder 14-1 through 14-N, remotely.

Figure 3:
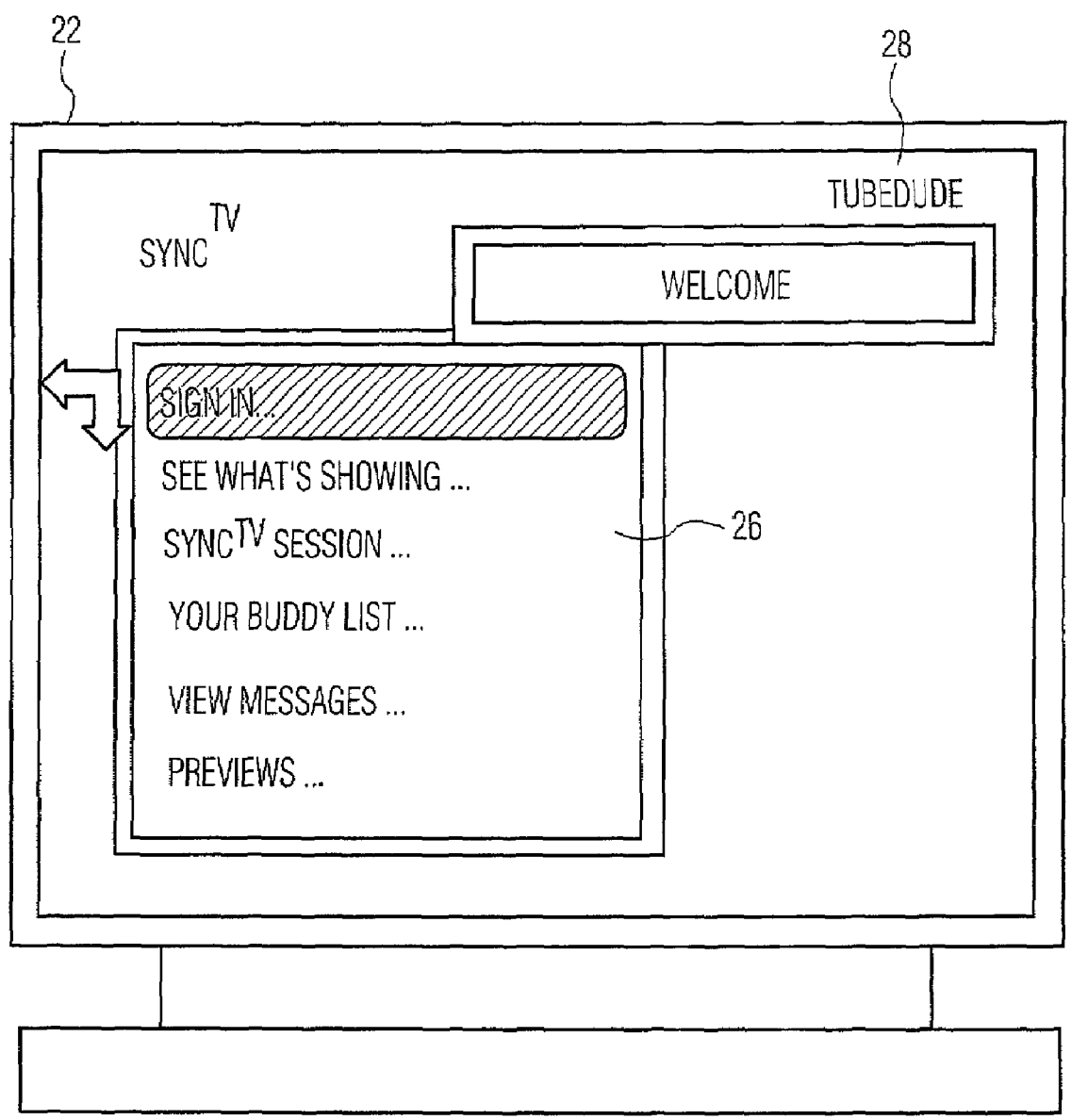
FIGS. 3 through 10 show examples of program displays responsive to program content and/or viewer profile information in accordance with the present invention.

FIG. 3 illustrates a typical welcome screen for the synchronized viewing option, which may be viewed on the screen of television 22. As illustrated in FIG. 3, the user has six options to select from in an options section 26 of the television screen. The options include Sign In, See What's Showing, SyncTV Session, Your Buddy List, View Messages and Previews. The name of the last user to sign in to the system is indicated in the upper right corner 28 of television 22. In this case, TubeDude was the last to sign on to the system. Therefore, if user 1 is not TubeDude, user 1 should choose the option entitled "Sign In". This process is important because other features of the personal video recorder, such as the buddy list and messages, are different for each user.

Figure 4:
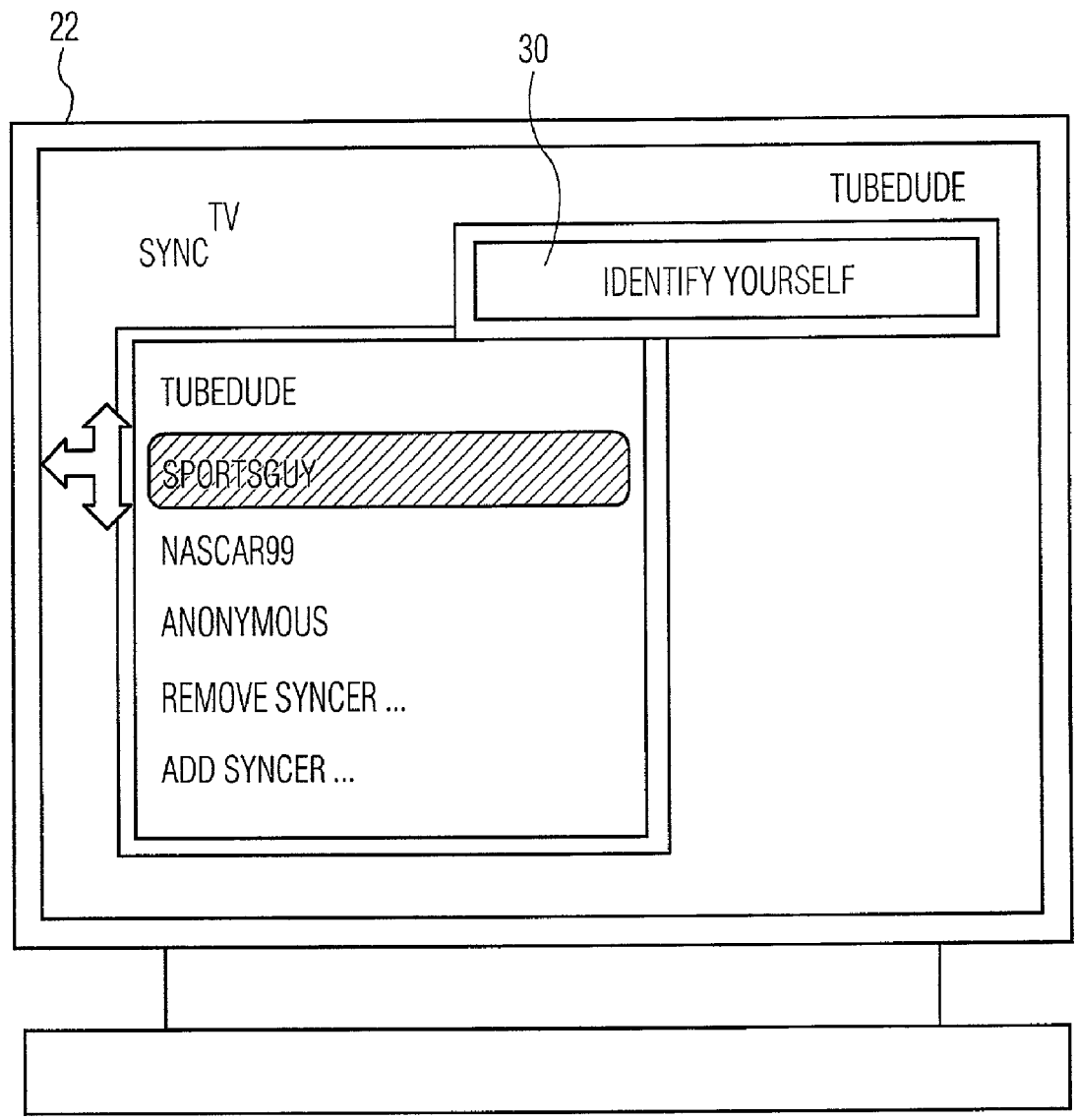

Referring now to FIG. 4, once the "Sign In" option is selected on the welcome screen illustrated in FIG. 3, a list of screen names will be displayed on television 22. The screen names shown in FIG. 4 include TubeDude, SportsGuy, NASCAR99 and Anonymous. The user should select one of these screen names or add a new one for himself or herself. The screen shown in FIG. 4 includes two additional options—"Remove SYNCer" and "Add SYNCer". A SYNCer is a person who uses the synchronization feature in accordance with the present invention.

The screens associated with the synchronization system also include a command or information line 30 located in the vicinity of the upper right corner of television 22. The text in command line 30 in FIG. 4 is prompting the user to identify himself or herself. The identity "SportsGuy" is shown highlighted in FIG. 4.

Figure 5:
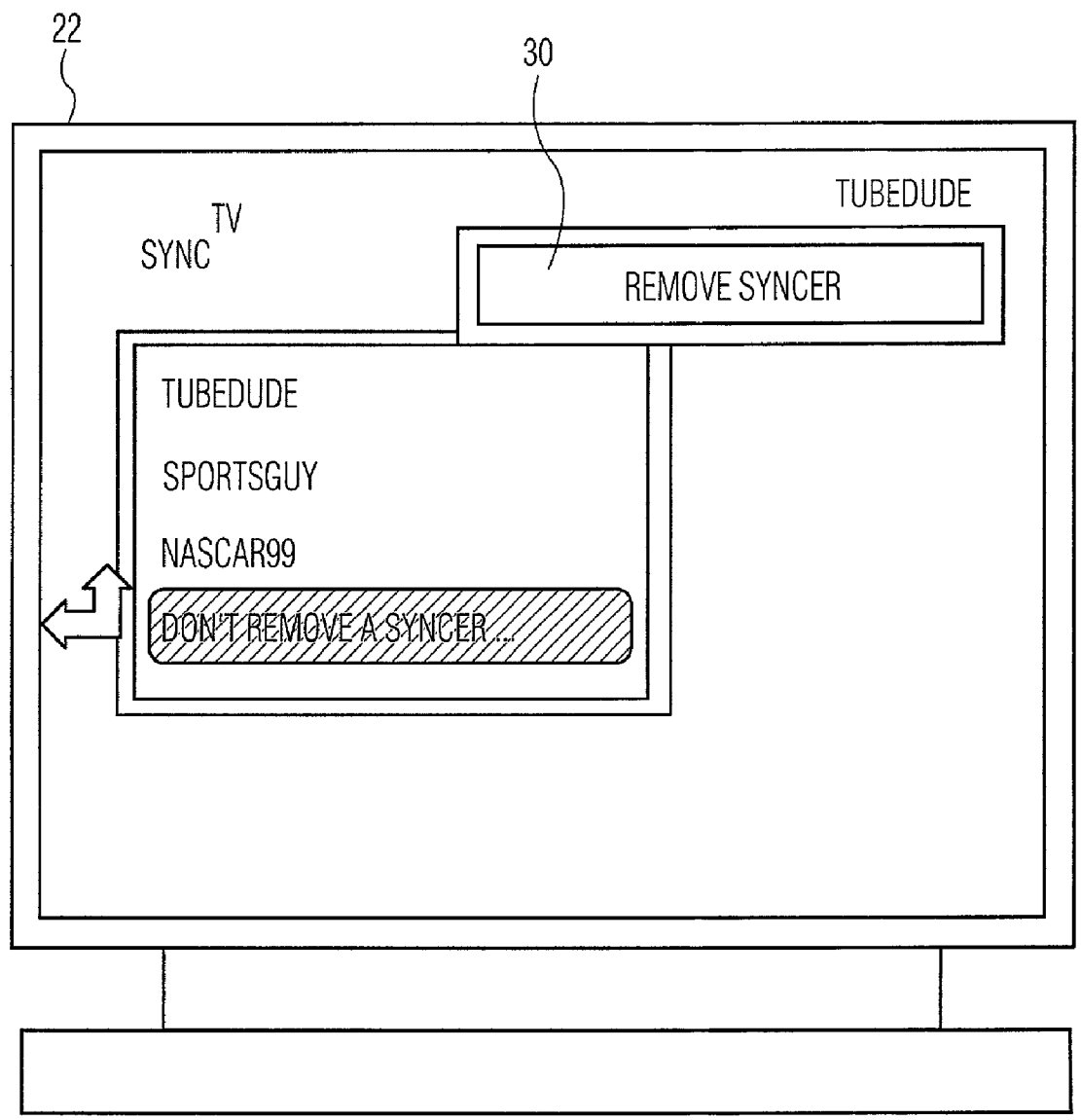

FIG. 5 illustrates the screen that will appear if the user chooses "Remove SYNCer" in FIG. 4. As shown, the screen in FIG. 5 includes the screen names for each of the users that have previously signed on to the personal video recorder, along with an option to "Don't Remove a SYNCer".

Figure 6:
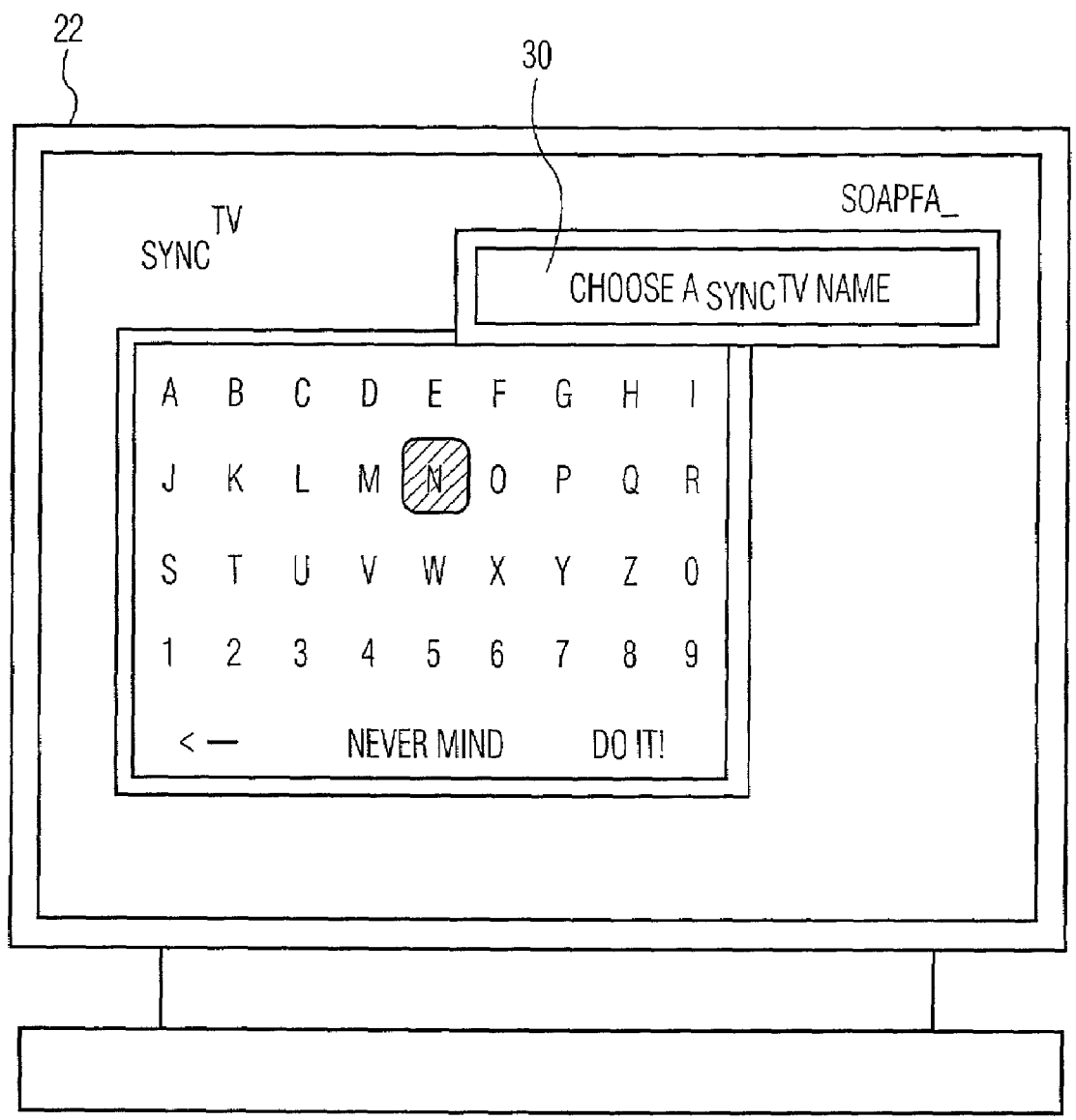

FIG. 6 illustrates the screen that will appear if the user chooses "Add SYNCer" in FIG. 4. The screen illustrated in FIG. 6 includes alphanumeric characters to facilitate entry of data into the system. The command line 30 is now prompting the user to choose a SyncTV name. Utilizing the alphanumeric keypad, the user is able to type a name that will identify that user and associate that user with other features of the system.

Figure 7:
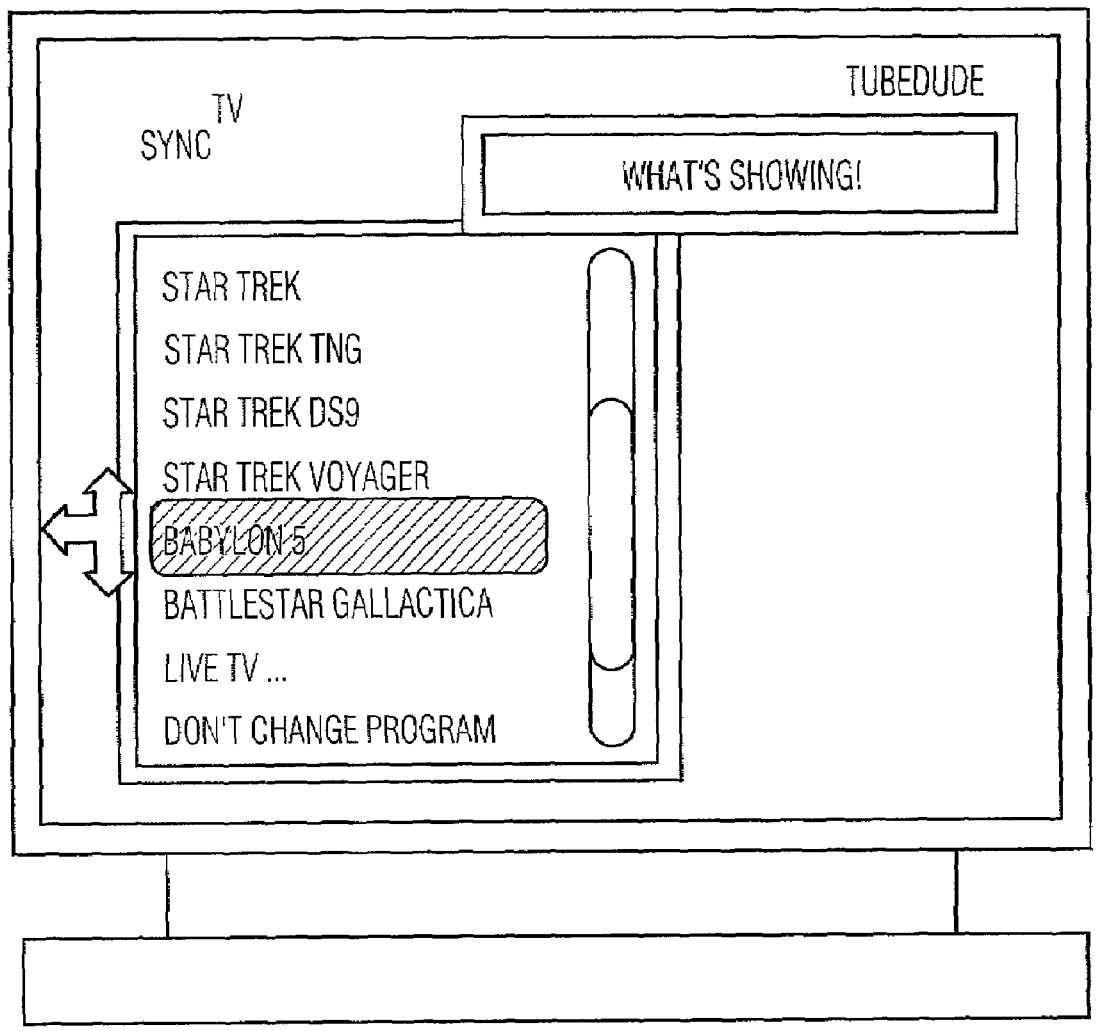

FIG. 7 illustrates an example of a screen that a user would encounter when the "What's showing" choice is selected on the Welcome screen illustrated in FIG. 3. The first six entries on the screen in FIG. 7 represent programs that were previously recorded on the personal video recorder 14. By selecting one of these entries, the personal video recorder 14 will begin playing the selection. The user also has the option of selecting live television or remaining with the current program.

Figure 8:
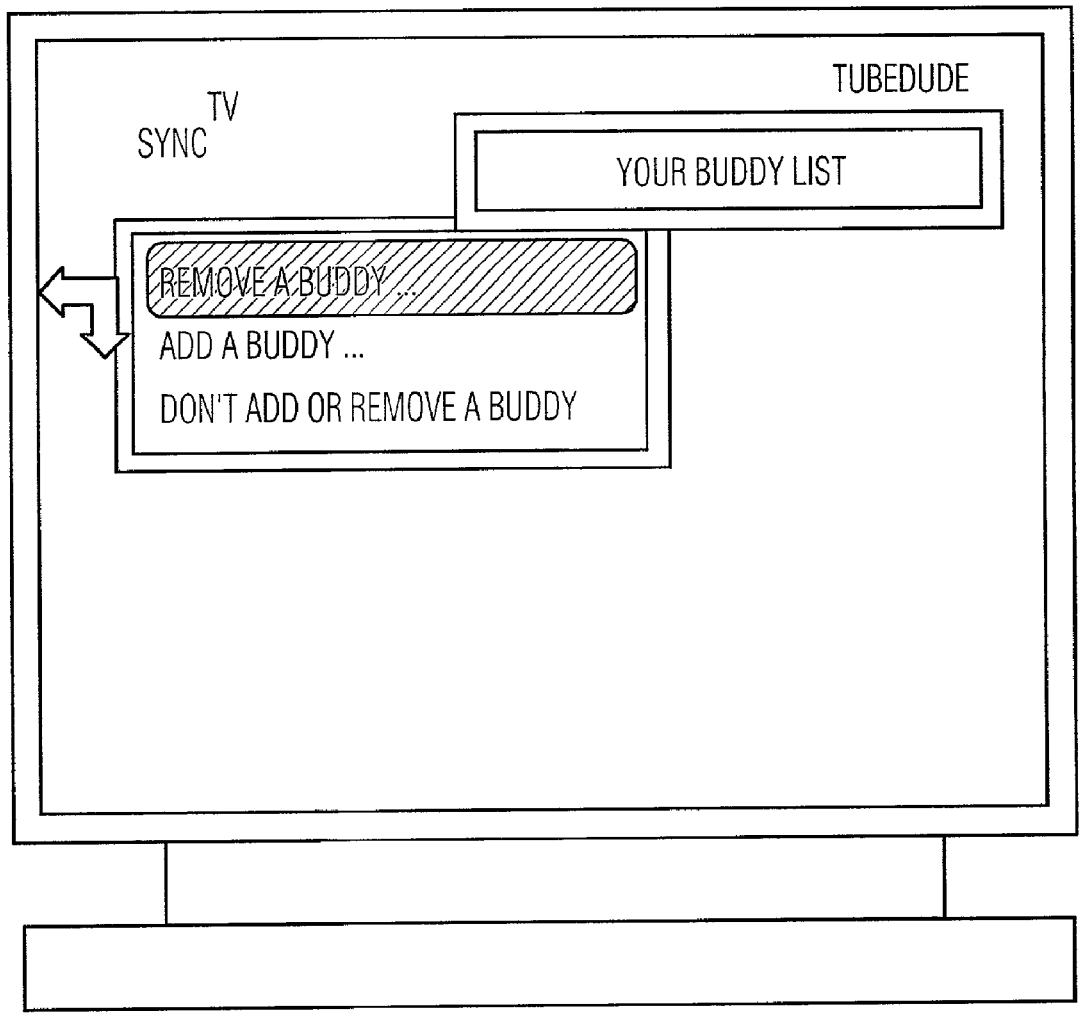
Figure 9:
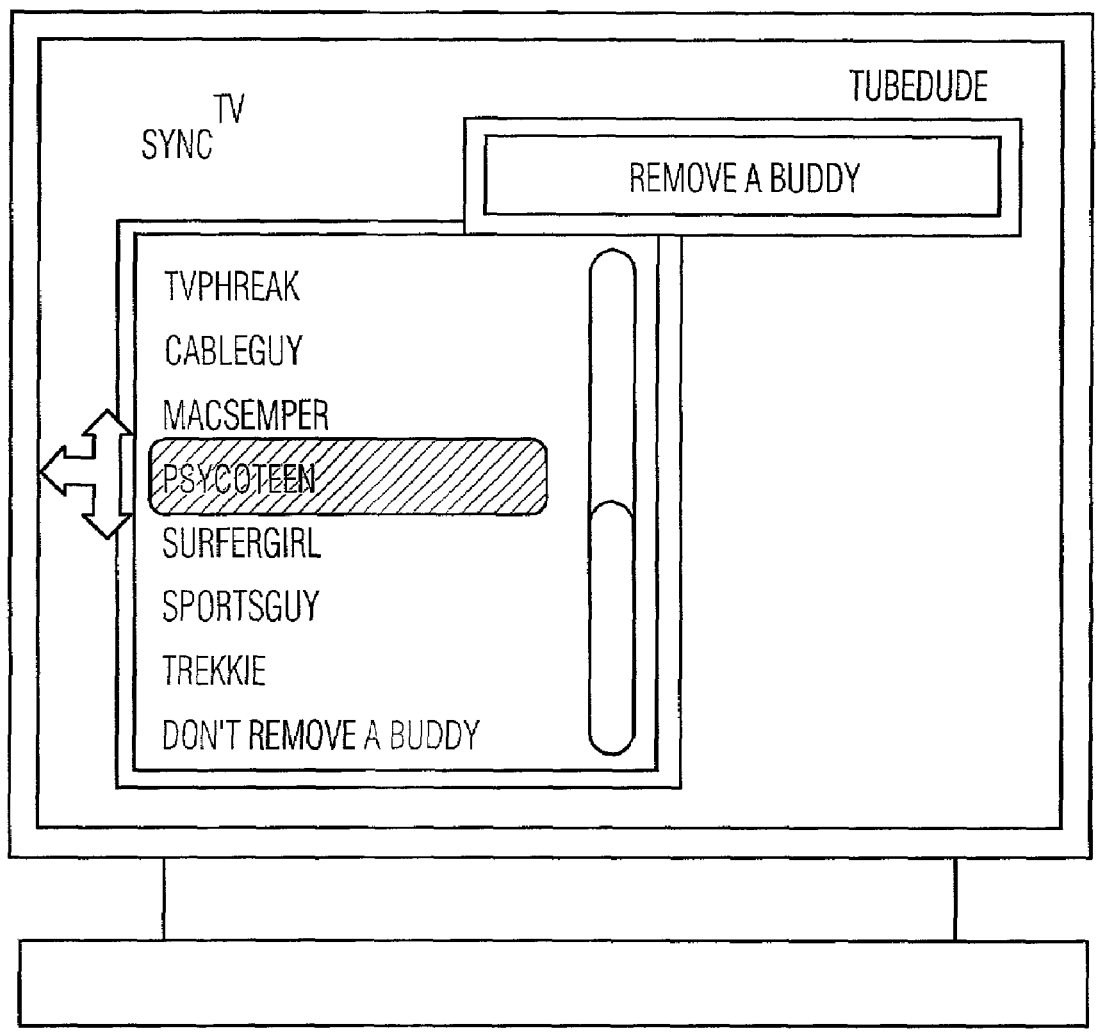
Figure 10:
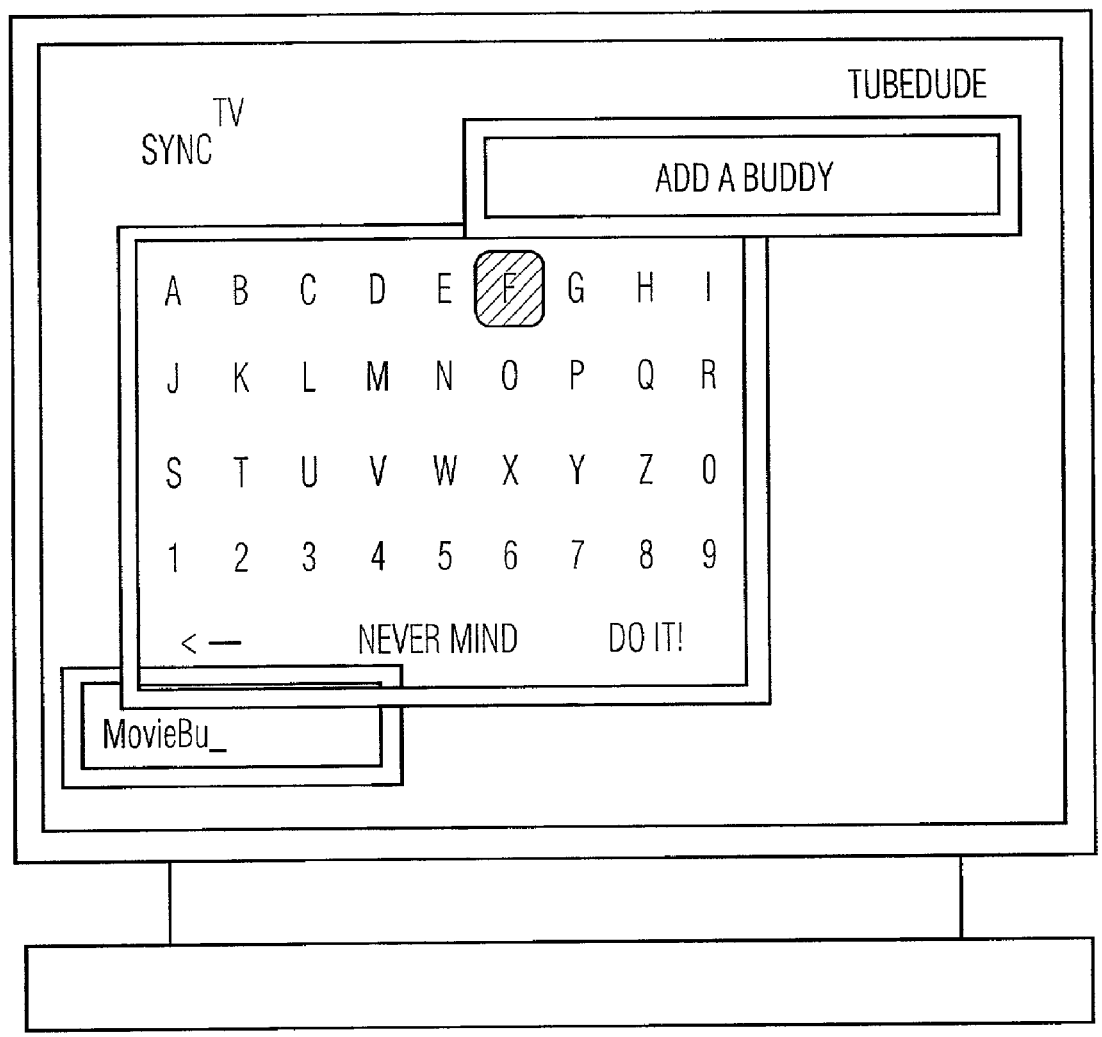

FIGS. 8 through 10 illustrate screens that provide the user with alternatives for modifying the buddy list. The screen illustrated in FIG. 8 becomes activated when the user selects "Your Buddy List" from the Welcome screen illustrated in FIG. 3. The buddy list is specific to the user who has signed on to the system. For example, the people that are listed on the screen in FIG. 9 were entered into the system by TubeDude. The buddy list may also include the Internet addresses of the people with whom the user who is currently signed on to the system typically watches television with.

Once User 1 selects the name on the buddy list that is associated with User 2, a message appears on User 2's screen that User 1 wants to watch television in a synchronized manner. User 2 is given the option of accepting or declining the offer made by User 1. If and when User 2 accepts the offer made by User 1, all personal video recorder commands that either of them enters will affect the other's personal video recorder. Alternatively, the system may be configured to have one user be the master and the other one the slave. The first screen that both users are presented with may be a screen similar to that shown in FIG. 7, listing all of the shows that the two users have in common, including a live television option. To ensure that the two personal video recorders stay in synchronization, the personal video recorder that initiated the synchronized viewing may send out a status message after every command is sent and received, and at a predetermined rate, e.g., once every minute, if no commands have occurred. The status message will preferably include an indication of the program being watched, the time or frame into the program, and the current mode of watching (e.g., normal play, fast forward, pause, etc.).

Other embodiments for synchronizing personal video recorders in accordance with the present invention are contemplated. For example, the system 10 may be generally configured as illustrated in FIG. 1 with the voice being transmitted over the Internet using voice over Internet Protocol. This configuration alleviates the need for the telephone network 20. That is, a local telephone 24 could be connected to the Internet (via a wireless connection or any other means known to one having ordinary skill in the art) Alternatively, the personal video recorder 14 could use a microphone for voice pick-up and multiplex the voice output with the audio going to the television 22.

Another embodiment for synchronizing personal video recorders is contemplated with the configuration illustrated in FIG. 1, but without the Internet connection 18. In this embodiment, the synchronization signals between the two personal video recorders 14 would be multiplexed with the voice and communicated via the telephone network 20.

The system 10 illustrated in FIG. 2 has one communication network associated therewith. An Internet network 18 interconnects the personal video recorders 14-1 through 14-N located at the N-number of different locations. The Internet network 18 supplies the means for communicating information between the personal video recorders 14-1 through 14-N such that synchronization may be achieved.

There are at least two main differences between the embodiment discussed with reference to FIG. 2, (which was configured for use by more than two users) and an embodiment having a system which was configured for use by only two users.

One difference between the system that is configured for a maximum of two users and the system that can be applied to more than two users is that the start-up procedure needs to be modified. With the possibility of many users joining the collective viewing of a program, a mechanism similar to the buddy lists discussed above can be implemented. That is, if you are on someone else's buddy list, at any time you can investigate what that buddy is watching and select to join in on what the buddy is watching (possibly as part of an existing collective).

Another option would be to allow a majority of the existing users in the collective to have the capability to vote the newly joined user out of that particular session. This option may be accomplished by configuring the system such that one of the users in the collective selecting a vote dialog box and entering the name of the candidate to be voted off. A choice box will then appear on all of the televisions of the collective for the other users to vote. Typical reasons for wanting this type of control include wanting to vote off someone who (i) talks too much or (ii) "hogs" the remote too often.

Yet another option includes the ability for an individual user, or the group as a whole, to be able to deny access to specific users or all users in general. This feature would provide privacy for the existing users and would also permit the existing users to be able to censor the programs that they are watching.

Another difference between the system that is configured for a maximum of two users and the system that can be applied to more than two users is that, in the latter system, control of the session must either be distributed or server based so that the users have the ability to participate and/or withdraw from the collective viewing. That is, keeping track of all members of a collective and forwarding voice and control signals to/from each participant to all others could be done by a server on the Internet. Another method would be for each user in a collective to keep track of all other participants. To do this, when a new user joins in via a buddy, the buddy must announce the newcomer's presence to all members of the existing collective. This announcement may also be accomplished by an automatic message forwarded electronically by the buddy to all of the other users.

Figure 11:
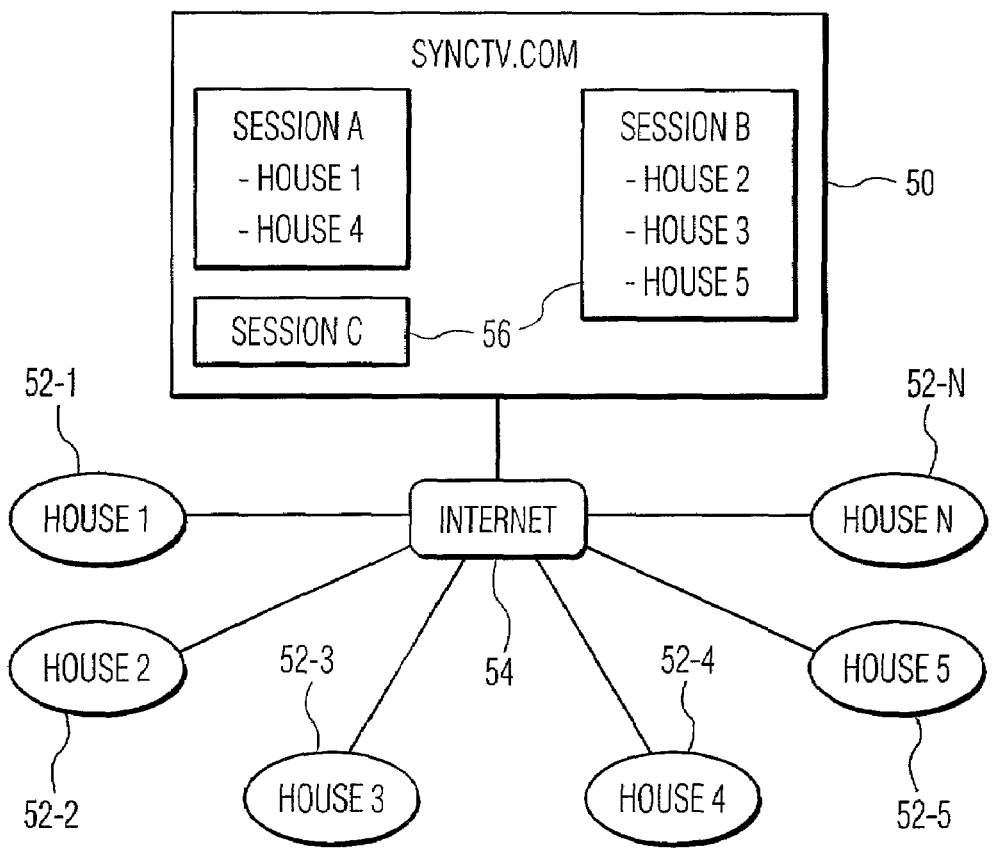
FIG. 11 is a block diagram illustrating an example of a server-based embodiment of the present invention.

Referring now to FIG. 11, there is shown a block diagram illustrating an example of a server-based embodiment of the present invention. In this embodiment, a server 50 at SyncTV.com would monitor all of the connections for a variety of sessions. When a signal comes in from a specific location 52-1 through 52-N (e.g., House 1 through House N), the server 50 will perform a look-up operation to determine which other location 52 is connected and which session the location 52 is connected to. Each of the locations 52-1 through 52-N connect to server 50 through connections to the Internet 54. Server 50 may be configured to have a display output 56 which will allow the users at the various locations to see which locations are connected to which sessions at any given time.

Figure 12:
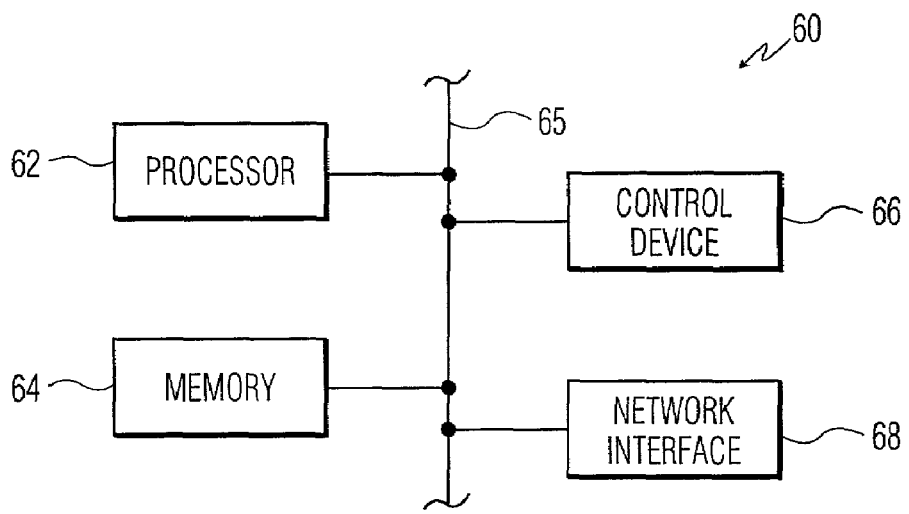
FIG. 12 is a block diagram illustrating a processing device for use in accordance with an embodiment of the present invention.

FIG. 12 shows an example of a processing device 60 that may be used to implement, e.g., a program for executing the synchronization of the personal video recorders 14 discussed above with reference to FIGS. 1 and 2. The device 60 includes a processor 62 and a memory 64 which communicate over at least a portion of a set 65 of one or more system buses. Also utilizing at least a portion of the set 65 of system buses are a control device 66 and a network interface device 68. The device 60 may represent, e.g., one of the personal video recorders 14, televisions 22, remote controls 16, a set-top box, a desktop or any other type of processing device for use in implementing at least a portion of a synchronization process in accordance with the present invention. The elements of the device 60 may be conventional elements of such devices.

For example, the processor 62 may represent a microprocessor, central processing unit (CPU), digital signal processor (DSP), or application-specific integrated circuit (ASIC), as well as portions or combinations of these and other processing devices. The memory 64 is typically an electronic memory, but may comprise or include other types of storage devices, such as disk-based optical or magnetic memory. The control device 66 may be associated with the processor 62. The control device 66 may be further configured to transmit control signals.

The synchronization techniques described herein may be implemented in whole or in part using software stored and executed using the respective memory and processor elements of the device 60. For example, the synchronization of personal video recorders may be implemented at least in part using one or more software programs stored in memory 64 and executed by processor 62. The particular manner in which such software programs may be stored and executed in device elements such as memory 64 and processor 62 is well understood in the art and therefore not described in detail herein.

It should be noted that the device 60 may include other elements not shown, or other types and arrangements of elements capable of providing the synchronization functions described herein.

Figure 13:
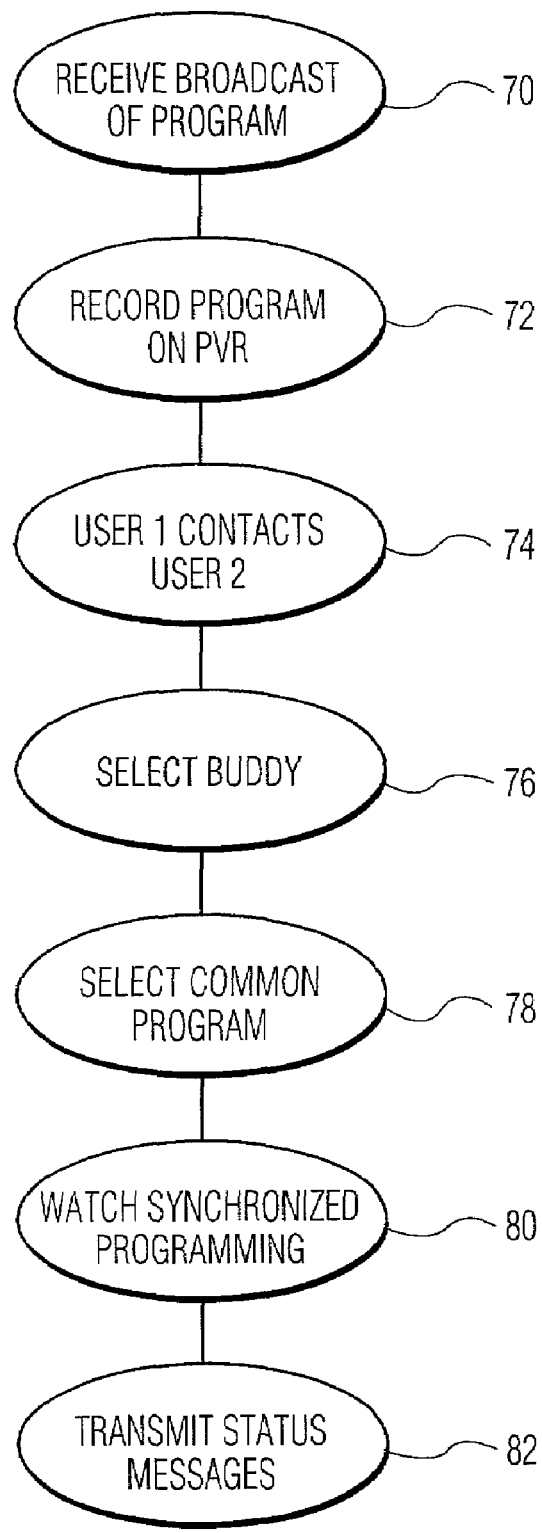
FIG. 13 is a flow diagram of an example synchronization process in accordance with an embodiment of the present invention.

FIG. 13 is a flow diagram that illustrates yet another embodiment of the present invention. Prior to starting the synchronization process, each of the users must receive and record a program, as shown in blocks 70 and 72. Alternatively, the users may select a live broadcast. As shown in block 74, the synchronization process may be initiated by one of the users (e.g., User 1 from House 1) calling the other user and the two users agreeing to watch television together while physically in two different locations. For this scenario, the two users keep the telephone line open and continue to the next step. User 1 then brings up a menu on the personal video recorder 14 which includes a list of names of potential participants for synchronized viewing. This screen includes the screen name and Internet address of the potential participants. It also includes the ability to add new names or remove old names. In this case User 1 selects User 2's screen name, as indicated in block 76. On User 2's screen a message appears that User 1 wants to watch television in a synchronized manner. User 2 is given the option of accepting or declining the offer of User 1. If and when User 2 agrees to accept the offer of User 1, all commands that either of them enters are sent to the other's personal video recorder. For example, if User 1 presses the rewind button, a rewind signal will also go to User 2's personal video recorder 14. This is true for all control signals such as, e.g., pause, reverse, fast forward, go to end, etc. Therefore, all conflicts about what to watch, when to pause, etc. are handled by the two users via their telephone discussion, or by sending appropriate signals to the personal video recorders.

The first screen that both users are presented with is preferably a screen that lists all of the shows that they have in common, including a live television option. The users must then select a common program to watch, as indicated in block 78. Once the start signal is transmitted to each of the users, the users will begin to watch synchronized programming, as indicated in block 80. As shown in block 82, to guarantee that the two personal video recorders stay in synchronization, the personal video recorder that initiated the synchronized viewing may send out a status message after every command that is sent and received, and once every minute if no commands have occurred. As noted previously, the status message may include the title of the selection being watched, the time or frame into the show, and the current mode of watching (e.g., normal play, fast forward, pause, etc.).

Although the illustrative embodiments of the present invention have been described herein with reference to the accompanying drawings, it is to be understood that the invention is not limited to those precise embodiments, and that various other changes and modifications may be affected therein by one having ordinary skill in the art without departing from the scope or spirit of the invention. All such changes and modifications are intended to be included within the scope of the invention as defined by the appended claims.

What is claimed is:

1. A method for synchronizing the video output of a first personal video recorder with at least one second personal video recorder comprising the steps of:
    selecting at a given one of the first and at least one second recorders a common program that resides in memory of each of the recorders;
    transmitting a signal from one of the first and at least one second recorder to the other of the first and at least one second personal video recorder to simultaneously initiate a start sequence for playback of the common program in each of the first and at least one second personal video recorder; and
    transmitting a system status signal at a predetermined rate after a command from the first personal video recorder to the at least one second personal video recorder.

2. The method for synchronizing the video output of personal video recorders as recited in claim 1, further comprising the step of receiving at least a portion of a broadcast program.

3. The method for synchronizing the video output of personal video recorders as recited in claim 2, further comprising the step of recording the at least a portion of a broadcast program on the first and at least one second personal video recorder.

4. The method for synchronizing the video output of personal video recorders as recited in claim 1, further comprising the step of recording at least a portion of a broadcast program in a personal video recorder.

5. The method for synchronizing the video output of personal video recorders as recited in claim 1, wherein the signal is transmitted over the Internet.

6. The method for synchronizing the video output of personal video recorders as recited in claim 1, further comprising the step of selecting at least one second personal video recorder having at least one program stored in memory in the at least one second personal video recorder.

7. The method for synchronizing the video output of personal video recorders as recited in claim 1, further comprising the step of simultaneously and synchronously viewing the common program in two different locations.

8. The method for synchronizing the video output of personal recorders as recited in claim 1, wherein the first personal video recorder is controlled by a remote control device.

9. The method (or synchronizing the video output of personal recorders as recited in claim 8, wherein control signals transmitted to the first personal video recorder by the remote control device also control the at least one second personal video recorders.

10. A system for synchronizing the video output of personal video recorders comprising:
- at least two personal video recorders having at least one common program scored in memory associated with each of the at least two personal video recorders; and
- a communication means operatively connected to the at least two personal video recorders for:
  - transmitting a signal from one of the at least two personal video recorders to the other of the at least two personal video recorders to simultaneously initiate a start sequence for playback of the common program in each of the two personal video recorders; and
  - transmitting a system status signal at a predetermined rate after a command from the first personal video recorder to the at least one second personal video recorder.

11. The system for synchronizing the video output of personal video recorders as recited in claim 10 wherein the communication means is an Internet network.

12. The system for synchronizing the video output of personal video recorders as recited in claim 10 wherein the communication means is a telephone network.

13. The system for synchronizing the video output of personal video recorders as recited in claim 10 further comprising a television operatively connected to the personal video recorders.

14. The system for synchronizing the video output of personal video recorders as recited in claim 10 further comprising a remote control device for transmitting control signals to the personal video recorders.

15. In association with a first personal video recorder, an apparatus for synchronizing the video output of the first personal video recorder with at least a second personal video recorder, wherein each of the first and the second personal video recorder has a common program stored in memory associated therewith, the apparatus comprising:
- a control device associated with a processor and operative to:
  - transmit a signal from the first personal video recorder to the second personal video recorder for simultaneously initiating a start sequence in each of the first and second personal video recorders; and
  - transmit a system status signal at a predetermined rate after a command from the first personal video recorder to the at least one second personal video recorder.

16. The apparatus for synchronizing the video output of personal video recorders as recited in claim 15 wherein the signal is transmitted over the Internet.

17. The apparatus for synchronizing the video output of personal video recorders as recited in claim 15, wherein the signal is transmitted over telephone lines.

18. The apparatus for synchronizing the video output of personal video recorders as recited in claim 15 wherein control signals transmitted to the first personal video recorder by the control device also control the second personal video recorder.

19. The apparatus for synchronizing the video output of personal video recorders as recited in claim 15 further comprising a television operatively connected to the first and second personal video recorders.

* * * * *